PORTABLE VERTICALLY TELESCOPING CAB-OVER CAMPER CABIN
Filed Aug. 1, 1966 6 Sheets-Sheet 1
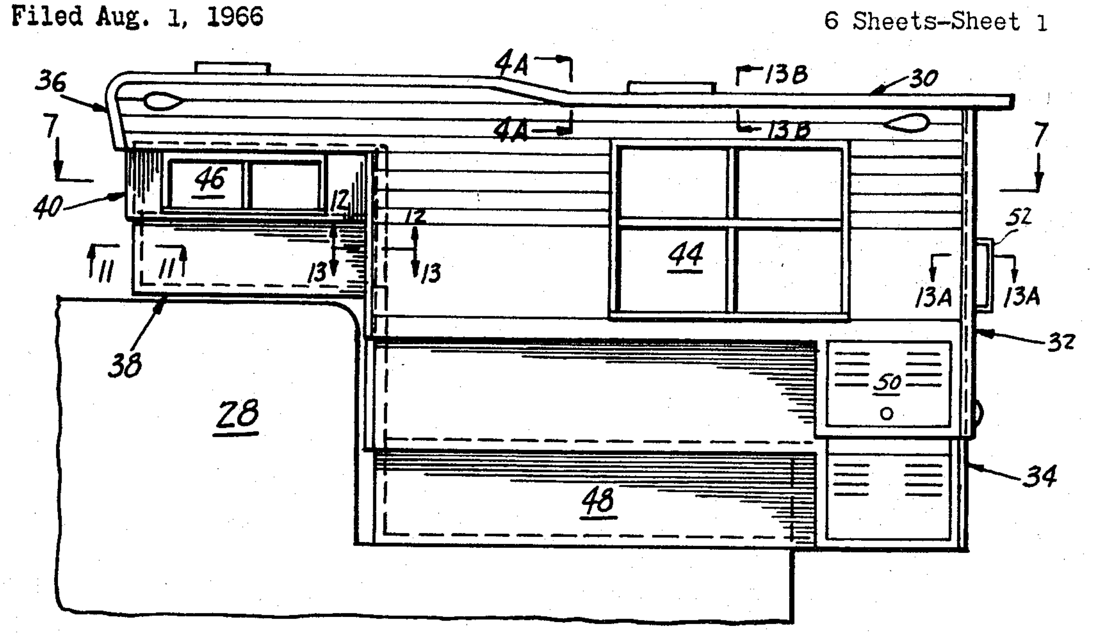
FIG. 1
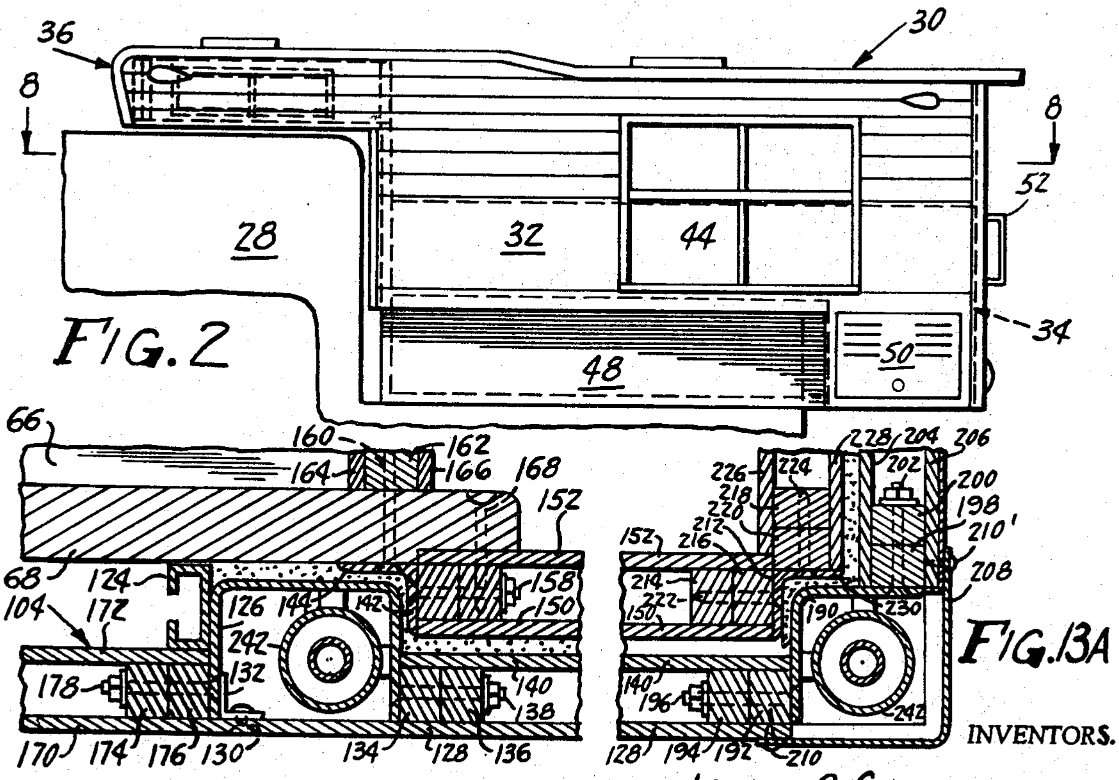
FIG. 2, FIG. 13A
FIG. 13
INVENTORS.
JAMES O. CRUMBAKER
LELAND F. LIEBSCHWAGER
BY Kimmel, Crowell & Weaver
ATTORNEYS.

PORTABLE VERTICALLY TELESCOPING CAB-OVER CAMPER CABIN

Filed Aug. 1, 1966

INVENTORS.
JAMES O. CRUMBAKER
LELAND F. LIEBSCHWAGER
BY Kimmel, Crowell & Weaver
ATTORNEYS.

PORTABLE VERTICALLY TELESCOPING CAB-OVER CAMPER CABIN

Filed Aug. 1, 1966 6 Sheets-Sheet 3

INVENTORS.
JAMES O. CRUMBAKER
LELAND F. LIEBSCHWAGER
BY Kimmel, Crowell & Weaver
ATTORNEYS.

PORTABLE VERTICALLY TELESCOPING CAB-OVER CAMPER CABIN

Filed Aug. 1, 1966 6 Sheets-Sheet 4

INVENTORS.

JAMES O. CRUMBAKER

LELAND F. LIEBSCHWAGER

BY Kimmel, Crowell & Weaver

ATTORNEYS.

PORTABLE VERTICALLY TELESCOPING CAB-OVER CAMPER CABIN

Filed Aug. 1, 1966

INVENTORS.
JAMES O. CRUMBAKER
LELAND F. LIEBSCHWAGER
BY Kimmel, Crowell & Weaver
ATTORNEYS.

PORTABLE VERTICALLY TELESCOPING CAB-OVER CAMPER CABIN

Filed Aug. 1, 1966 6 Sheets-Sheet 6

INVENTORS.
JAMES O. CRUMBAKER
LELAND F. LIEBSCHWAGER
BY Kimmel, Crowell & Weaver
ATTORNEYS.

United States Patent Office 3,533,656
Patented Oct. 13, 1970

3,533,656
PORTABLE VERTICALLY TELESCOPING CAB-OVER CAMPER CABIN

James O. Crumbaker, 9559 Kilwood Court, Orangevale, Calif. 95662, and Leland F. Liebschwager, Orangevale, Calif.; said Liebschwager assignor to said Crumbaker Filed Aug. 1, 1966, Ser. No. 569,329
Int. Cl. B60p 3/32
U.S. Cl. 296—23 19 Claims

ABSTRACT OF THE DISCLOSURE

A telescoping camper cabin having means for lifting the upper portion of the cabin to an expanded condition or alternatively for engaging a support to lift the entire camper cabin.

This invention relates to a camper cabin adapted for transportation on a truck or other vehicle which is vertically expanding by means of telescoping sections and which includes a cab-over portion which is vertically telescoping and which is adapted to extend over the cab of the carrying vehicle. This invention includes the over-all telescoping structure and the means for expanding and telescoping the camper cabin and the structural features thereof. This invention includes as an integral part of the camper cabin structure single means for expanding the camper cabin vertically and for lifting the entire cabin.

Telescoping cabins for trucks are known in the prior art. For example, a telescoping cabin is disclosed in Pat. No. 2,879,103 and in Pat. No. 2,893,780. Such camper cabins conventionally include upper and lower telescoping sections. In addition, it is known in the prior art to construct vertically telescoping camper cabins which have a cab-over portion. For example, Pat. No. 3,145,046 discloses a vertically telescoping camper cabin having a cab-over portion which may selectively be extended outwardly from the expanded cabin portion. Telescoping cabins of the first type suffer from the noticeable disadvantage of shortage of space. While the over-all volume of the camper is not greatly changed by the addition of a cab-over portion, the usable space is significantly expanded. It is common to provide camper cabins having a cab-over portion provided with a bed which may sleep one or more persons. The first named references do not provide this advantage. The second named reference provides, to a degree at least, the advantage of a cab-over portion but the provision of such a cab-over portion is inconvenient and time consuming and is not entirely satisfactory. It is therefore an object of this invention to provide an expandable vertically telescoping camper cabin which has integral with the camper cabin a cab-over portion which is vertically expandable simultaneously with the expansion of the main section of the camper cabin.

It is a further object of this invention to provide a camper cabin having a cab-over portion which may conveniently be expanded in a single operation.

It is a further object of this invention to provide a camper cabin having a cab-over portion which includes a lower telescoping portion, an upper telescoping portion and an intermediate telescoping portion to provide additional expansion in the cab-over area.

It is a further object of this invention to provide a camper cabin which is vertically telescoping having a vertically telescoping cab-over portion and means for expanding and contracting the camper cabin.

It is a further object of this invention to provide a camper cabin having a vertically telescoping cab-over portion having a lower telescoping portion, an upper telescoping portion and an intermediate floating telescoping portion.

It is a further object of this invention to provide a camper cabin having a vertically expandable cab-over portion including a floating telescoping window section.

It is a further object of this invention to provide a vertically telescoping camper cabin which has a single means for selectively vertically expanding the camper cabin and selectively lifting the entire cabin.

It is a further object of this invention to provide hydraulic lifting means which may selectively expand the camper cabin vertically or lift the entire cabin at will.

It is a further object of this invention to provide a unique expanding and lifting mechanism including a combination selecting and locking means for the lifting mechanism.

It is a further object of this invention to provide a unique cab-over portion having a floating section.

It is a further object of this invention to provide an expandable camper cabin having unique lifting and guiding means.

It is a further object of this invention to provide a vertically expandable camper cabin having a unique telescoping door structure.

It is a further object of this invention to provide a door structure for an expandable camper cabin which has unique operating means which may be operated by a single operator into positions.

It is a further object of this invention to provide unique structural features for expandable camper cabins.

Other objects of this invention, expressed and implied, will appear from the specification hereinafter and from the drawings to which reference is made.

With reference now to the drawings:

FIG. 1 is a side view of the camper cabin of this invention shown in its fully expanded position;

FIG. 2 is a side view of the camper cabin shown in its fully telescoped or retracted position;

FIG. 13*a* is the rear corner structural detail taken at line 13*a*–13*a* of FIG. 1 shown in cross section.

Figure 13B:
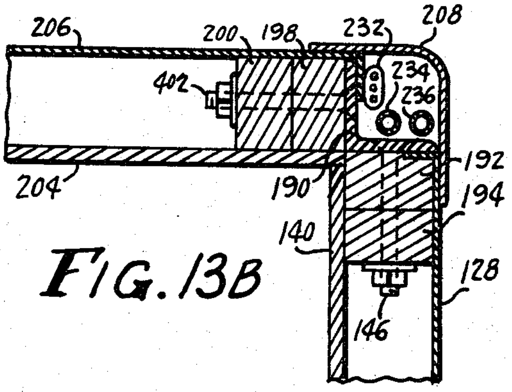
FIG. 13 is the intersection construction in detail shown in cross section taken at line 13—13 in the direction of the arrows.
Figures 14, 15, 16:
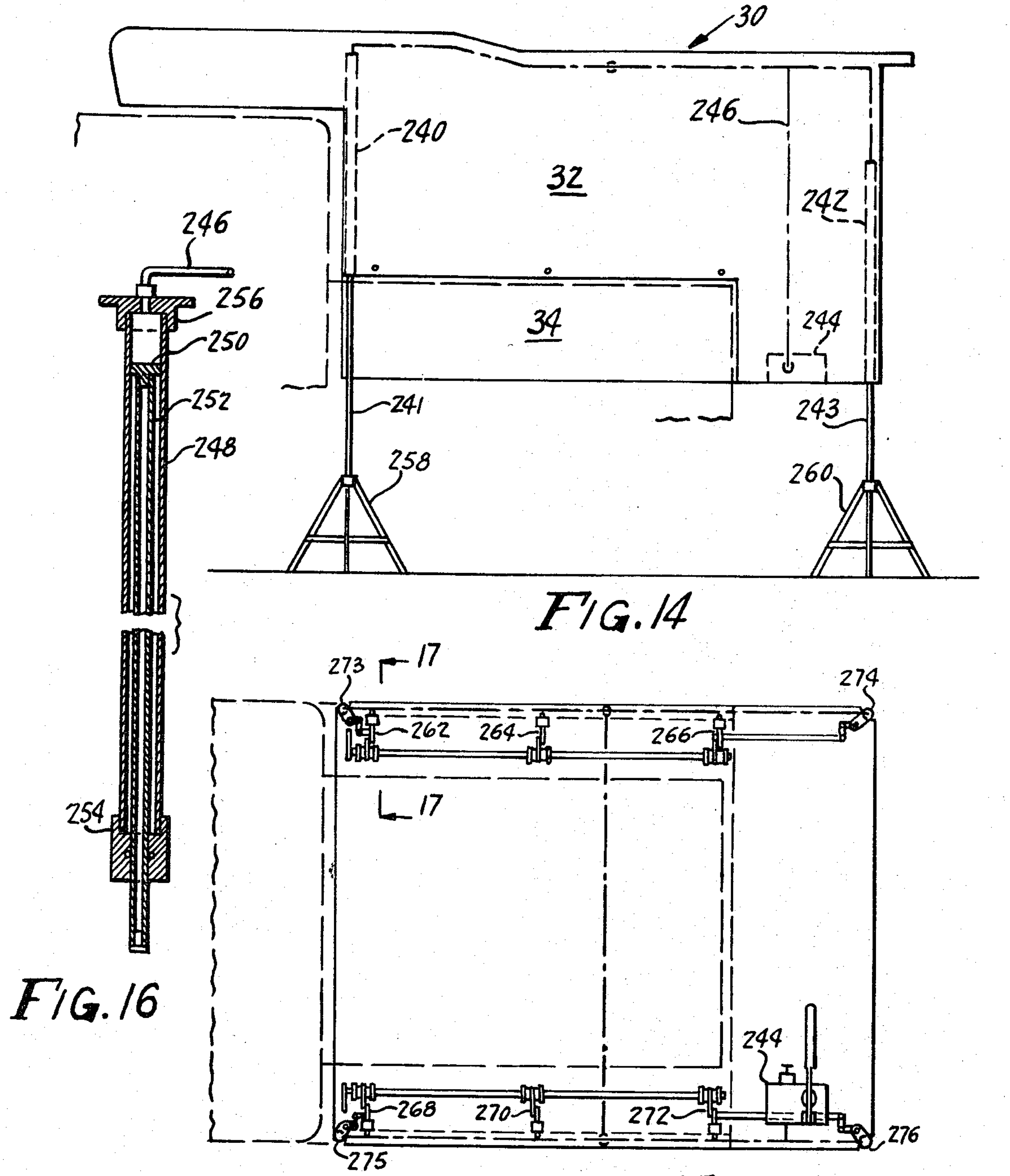
Figure 17:
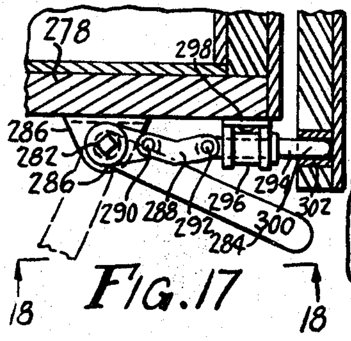
Figure 18:
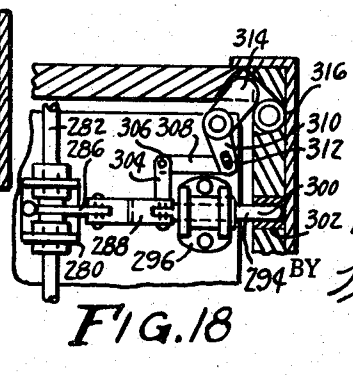
Figures 19, 20, 21, 22, 23:
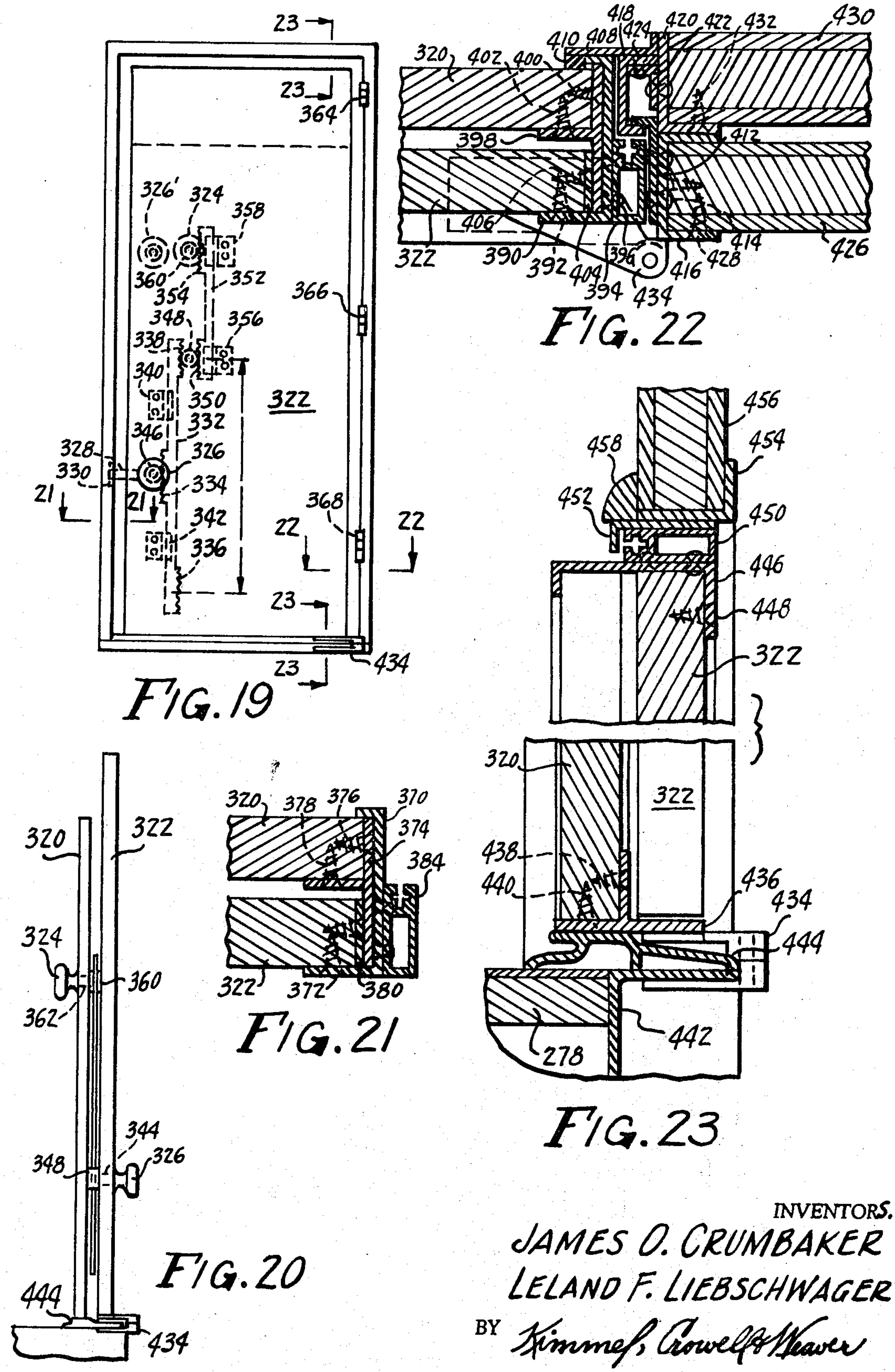

FIG. 13*b* is the roof corner construction showing the electrical and hydraulic lines taken at line 13*b*–13*b* in the direction of the arrows as shown in FIG. 1;

FIG. 14 shows the expanding and lifting mechanism in schematic;

FIG. 15 is the locking and expansion or lift select mechanism;

FIG. 16 is a detail of the hydraulic ram mechanism used in the lift and expansion system;

FIG. 17 is a detail of the lock mechanism taken substantially along line 17—17 in the direction of the arrows as shown in FIG. 15;

FIG. 18 is a top view of the lock and select mechanism taken substantially along line 18—18 of FIG. 17;

FIG. 19 is a plan view of the rear door of the camper;

FIG. 20 is a side view of the door of FIG. 19;

FIG. 21 is a detail of the opening edge of the door taken substantially along line 21—21 of FIG. 19 shown in cross section;

FIG. 22 is a detail of the door and hinge construction taken at line 22—22 in the direction of the arrows of FIG. 19 shown in partial cross section; and FIG. 23 is the top and bottom detail construction of the door taken at lines 23—23 in the direction of the arrows in FIG. 19 shown in cross section.

It will be understood, of course, that the invention is disclosed with reference to the specific embodiments; however, the spirit of the invention is not limited to the structural details or the particular mechanisms used herein to accomplish the desired results. The scope of the invention is limited only by the appended claims.

With reference now to FIG. 1, the expandable camper body 30 of this invention is adapted to be carried on a pick-up truck 28 or a similar vehicle. The camper body includes the following major portions: an upper section 32 and a lower section 34 comprising the main expandable body of the camper; and a cab-over portion comprising an integral extension 36 of the upper section 32 and an integral extension 38 of the lower section 34 and a floating section 40. In a preferred embodiment, the upper section 32 carries a window 44 and the floating section 40 carries in its windows 46. The lower section 34 has its bottom portion 48 adapted to be received by the bed of a pick-up truck and conforming in size thereto for carriage by the truck.

As will be seen in FIG. 2, the upper section 36 is telescopically received over the lower section 38 of the cab-over portion and the floating window section 40 is telescopically received between the upper section 36 and the lower section 38 and in the collapsed position the window section 40 and windows 46 are completely covered by the upper section 36 for protection.

The camper body may be equipped with conventional storage and access facilities shown generally at 50 and with the conventional handle 52 on the rear of the camper body. The camper body would, of course, be equipped in the conventional manner with running lights, reflector, and other hardware and facilities which are common to portable camper bodies.

Figures 3, 5:
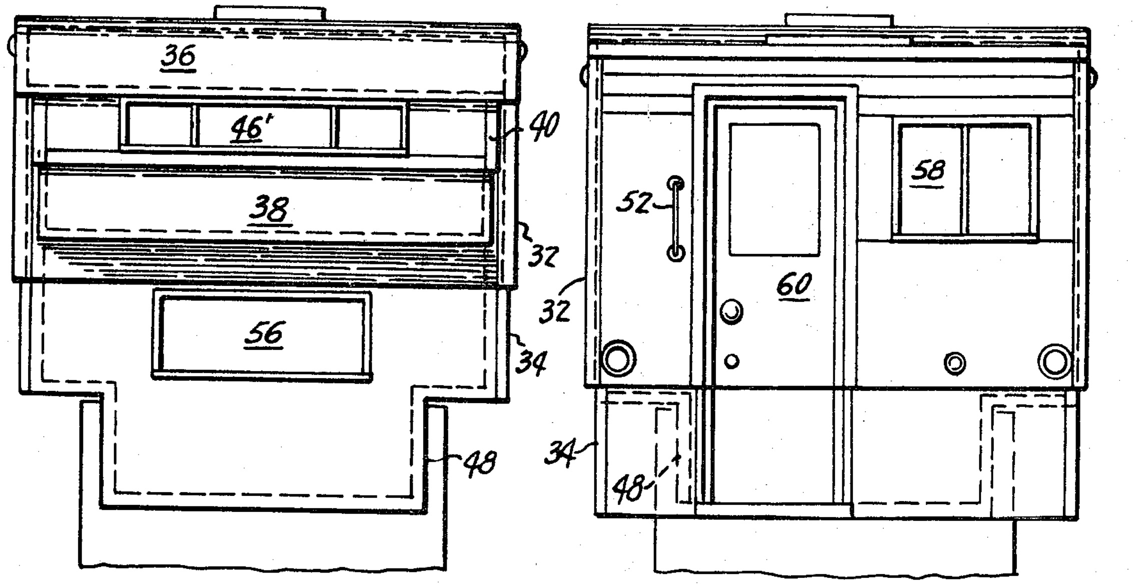
FIG. 3 is a front view of the camper shown in its fully expanded position showing the cab-over portion.
FIG. 5 is a rear view of the camper cabin in its fully expanded position showing the door of the cabin.
Figures 4, 6:
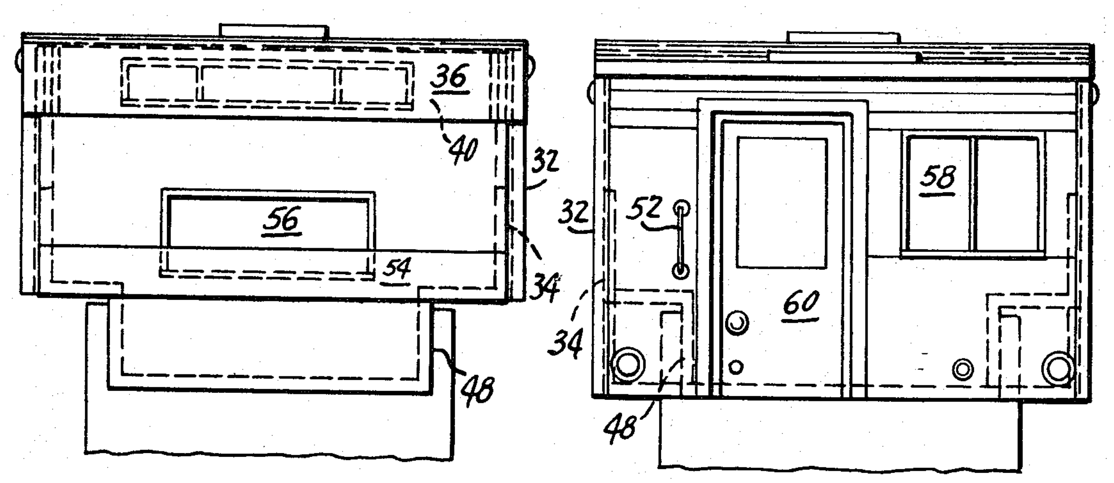
FIG. 4 is a front view of the camper cabin in its fully telescoped position.
FIG. 6 is a rear view of the camper in its fully telescoped position showing the telescoped door.

Referring now to FIGS. 3 and 4, the front construction of the camper body is shown with greater particularity. The upper section 36 of the cab-over portion is shown in FIG. 3 in the expanded position above the floating windows section 40 and the lower section 38 of the cab-over portion. A cross board 54 is provided under the lower section 38 running across the front of the camper attaching the sides of the upper section 32. The cross bar moves up and down during the telescoping operation with the upper section, as will be described hereinafter, and provides greater strength and rigidity for the upper section. The lower section may be equipped with a window 56 to permit viewing of the interior of the camper from inside the pick-up or other vehicle.

Referring now to FIGS. 5 and 6 which show the rear construction of the camper body in greater detail, a rear window 58 and a door 60 are provided along with handle 52 and conventional camper equipment such as reflectors and tail lights. The construction of door 60 and its operating and actuating mechanisms forms an important part of this invention and will be described in greater detail hereinafter.

Figure 7:
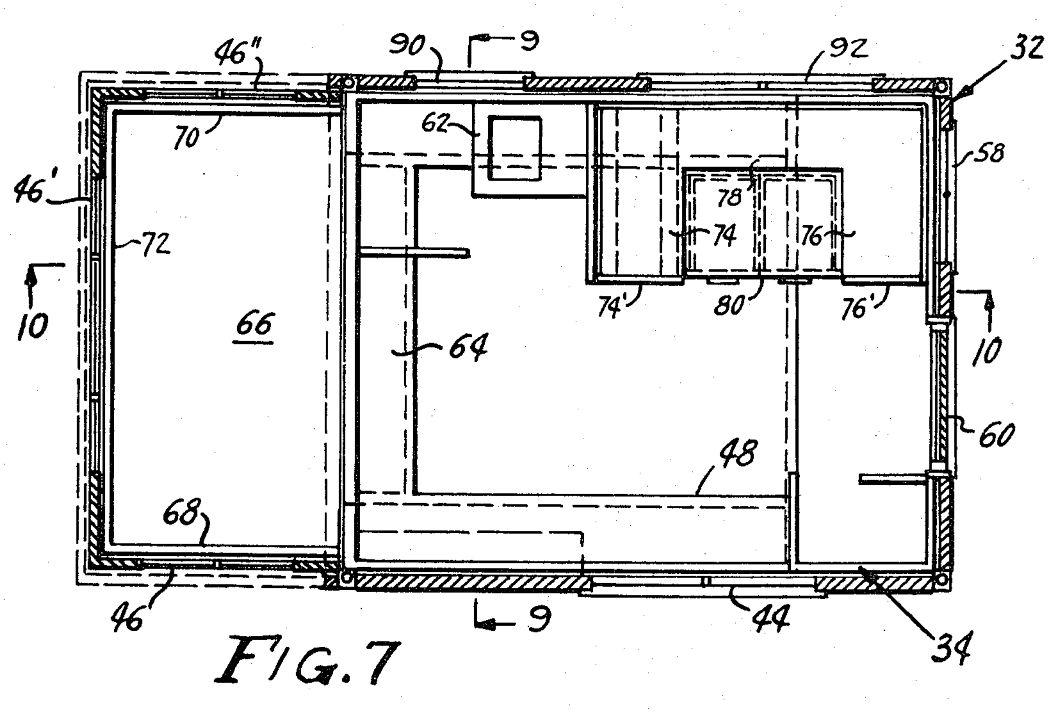
FIG. 7 is a top view of the camper cabin shown in partial section and cut-away taken substantialy along line 7—7 in the direction of the arrows as shown in FIG. 1.

Referring now to FIG. 7, the interior of the camper may contain conventional equipment such as a sink 62, a water supply tank 64, and such shelves and storage equipment and facilities, and bathroom facilities as are conventional in campers. The cab-over portion is provided with a floor 66 which is generally padded and forms a bed which may sleep one or more persons. The floor 66 is secured to wall portions 68 and 70 on the sides of the camper and wall portion 72 on the front of the camper which provide support for floor 66. The manner of connection of the side walls will be described hereinafter.

An important feature of this invention resides in the construction of the dinette area. The dinette area consists of two benches 74 and 76 which face each other and a bench portion 78 along the outside wall. The dinette also includes an adjustable table 80. Bench 74 may be expanded longitudinally in the manner shown in FIG. 8 with an extension 74′ being telescopically received under bench 74. Bench 76 is similarly constructed and may be expanded to the same extent. The benches 74 and 76 may be expanded and the table adjustably received between the benches and expanded in a similar manner to provide a full width bed for sleeping when the dinette is not in use.

Figure 8:
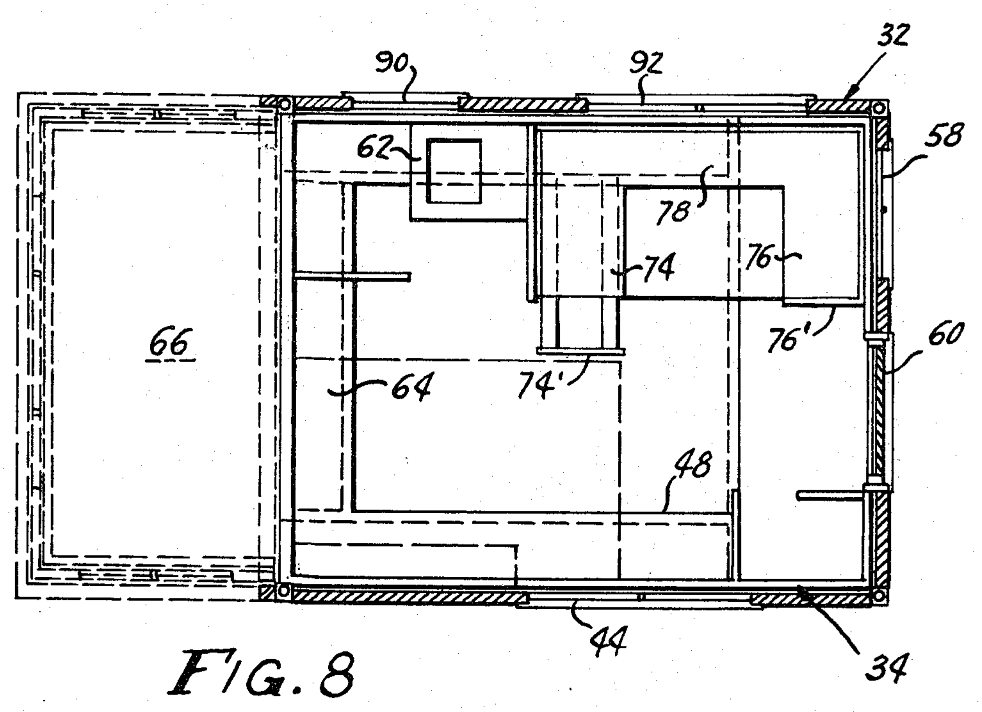
FIG. 8 is a top view of the camper cabin shown in partial cross-section and cut-away taken substantially along line 8—8 in the direction of the arrows as shown in FIG. 2.

FIG. 8 similarly shows the interior arrangement of the camper cabin with bench 74′ expanded.

Figures 9, 11:
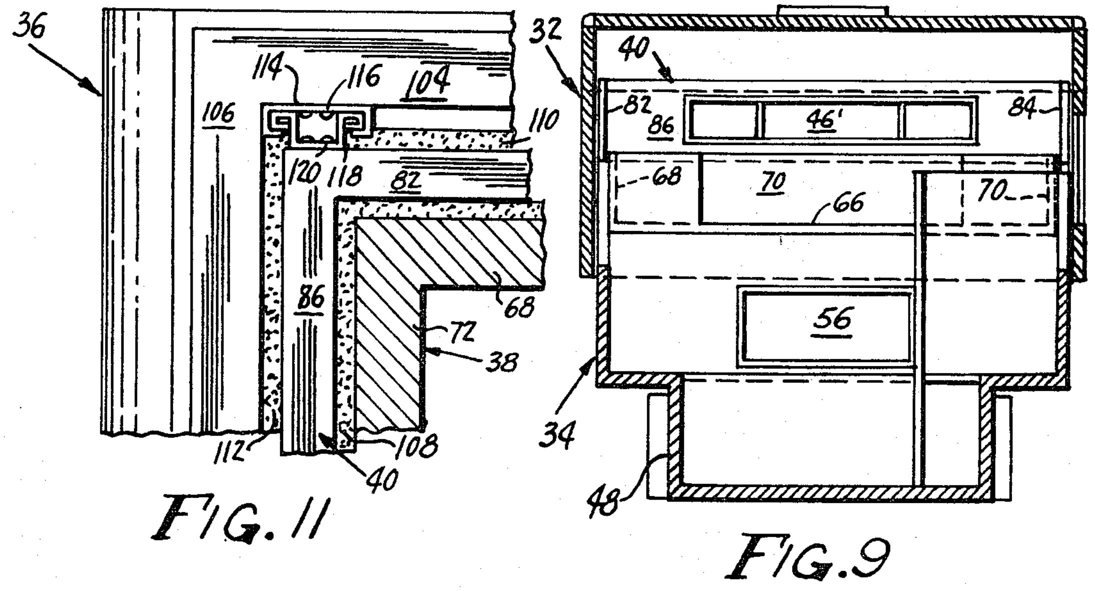
FIG. 9 is a vertical plan view of the interior of the camper cabin shown in partial cut-away and cross-section taken substantially along line 9—9 in the direction of the arrows as shown in FIG. 7.
FIG. 11 is a detail of the corner construction of the cab-over portion shown in partial cross-section view upwardly in the direction of the arrows as indicated at line 11—11 in FIG. 1.

With reference now to FIG. 9, the cross-sectional elevation of the camper body is shown in greater detail. In particular, the arrangement of the floating section 40 of the cab-over portion is shown. The floating section 40 has side walls 82 and 84 and a front wall 86 which carries window 46′ therein. Of course, it will be realized it is not necessary to supply the floating section 40 with windows; however, in the preferred embodiment, it is desirable to provide light and ventilation.

Figure 10:
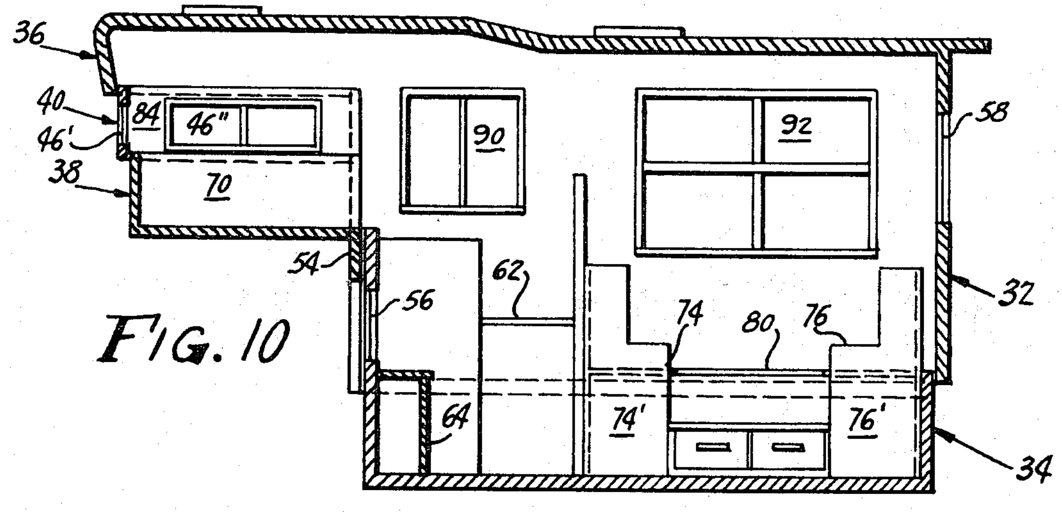
FIG. 10 is a side vertical plan view of the interior of the cabin in its expanded position taken substantially along line 10—10 in the direction of the arrows as shown in FIG. 7.

The longitudinal elevation view of the camper is best shown in FIG. 10. The arrangement of the dinette area, sink area and cab-over portion in the expanded position is most clearly shown in this figure. Window 90 may be provided over the sink 62 and window 92 may be provided over the dinette area. An additional window 46″ may also be provided in the floating section of the cab-over portion.

Reference is now made to FIG. 11. A detail of the corner construction of the cab-over portion is shown on FIG. 11. Side wall 68 and front wall 72 are joined to form the corner of the lower section 38 of the cab-over portion of the camper 30. Side wall 82 and front wall 86, the bottom of which is shown in FIG. 11, join to form the corner of the floating window section 40 of the cab-over portion of the camper 30. Side extension 104 and front wall 106 are joined to form the corner of the upper section 36 of the cab-over portion of the camper 30. Weather stripping 108, which may be of rubber, felt, plastic or any other desirable insulating and weather stripping material, is provided between the lower section 38 and the floating window section 40. Similarly, weather stripping 110 and 112 are provided between floating section 40 and upper section 36 of the cab-over portion of the camper 30. Floating section 40 is carried in and guided by U-shaped channel guide 114 which is attached to side wall 104 by frictional fasteners 116 or by other convenient means. Slidably received in channel guide 114 is a winged U-shaped guide 118 which may be attached to the floating section 40 by frictional fasteners 120 or by other convenient means. A similar guide means is provided at the opposite corner of the cab-over portion of the camper cabin.

Figure 12:
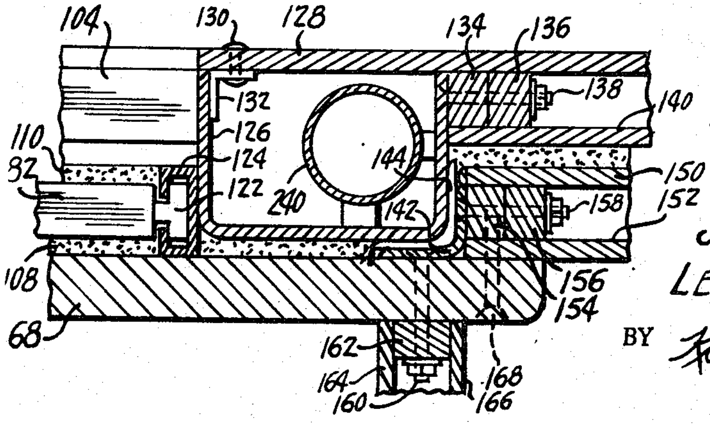
FIG. 12 is a view looking upwardly in the direction of the arrows as indicated at line 12—12 in FIG. 1 showing the intersection construction in partial cross-section between the main camper body and the cab-over portion.

With reference to FIG. 12, a similar guide means is also provided at the intersection of the cab-over portion and the main body of the camper. The rear edge of the floating window section 40 may carry a winged U-shaped or T-shaped guide 122 which is slidably received in U-shaped channel guide 124 in the manner described with reference to channel guide 114 and winged U-shaped guide 118. The front corner of the main camper body is supported by channel member 126 to its U-shaped channel member 124 and the rearwardmost edge of the side extension 104 is attached. Side panel 128 is attached by frictional fastener 130 to angle member 132 which is, in turn, attached to channel member 126. Side panel 128 may be glued or otherwise attached to double stud members 134 and 136 which are attached by bolt 138 to channel member 126. An inner side panel 140 of the upper section may similarly be attached to stud members 134 and 136.

Corner support for the lower section is provided by angle member 142. Angle member 142 and channel member 126 are slidably related to each other through slide guide 144 which, in the preferred embodiment, comprises a Teflon strip or strip of other inherently lubricating material. It would, of course, be possible to replace this with any conventional lubricated sliding means but the advantageous properties of Teflon would be lost. The side of the lower section of the camper body comprises an outer side panel 150 and an inner side panel 152 which may be glued or otherwise attached to stud members 154 and 156 which are attached by bolt 158 to corner angle member 142.

Side wall member 68 of the lower section of the cab-over portion is attached by bolt 160 which also attaches stud member 162 to corner angle member 142. Front outer panel 164 and front inner panel 166 are attached to stud 162 by conventional means. The rearwardmost end of side wall 68 may be attached to stud members 154 and 156 by any desired means such as a frictional fastener 168.

A hydraulic ram 240 used for raising the entire camper or selectively extending the camper is located in channel member 126 and will be described hereinafter.

The structural features shown in FIG. 13, to which reference is now made, are in most respects similar to those of FIG. 12. As shown in FIG. 13, the upper section of the cab-over portion is formed by side extension 104 which is comprised of an outer side panel and an inner side panel 172 which are glued or otherwise attached to studs 174 and 176 which are secured by bolt 178 to angle member 132 and channel member 126.

The rear corner construction is shown in detail in FIG. 13*a*. Support for the rear corner of the upper section is provided by a vertical angle member 190 to which studs 192 and 194 are secured by bolt 196. Side panels 128 and 140 are secured to studs 192 and 194 in a conventional manner. Studs 198 and 200 are secured by bolt 202 to rear angle member 190. Rear panels 204 and 206 are secured to studs 198 and 200 in a conventional manner. The corner of the camper is covered by corner member 208 which may be secured by frictional fasteners 210 or by other conventional means.

Support for the corner of the lower section is provided by angle member 212 to which studs 214 and 216 and studs 218 and 220 are secured by frictional fasteners 222 and 224. Side panels 150 and 152 are secured to studs 214 and 216 and panels 226 and 228 are secured to studs 218 and 220. Slidable engagement between angle members 190 and 212 is provided by Teflon slide guide 230. Hydraulic rams are received in the corner sections to expand the camper and to lift the camper selectively as will be described hereinafter.

The structure of the roof corner is shown in FIG. 13*b* which is, in most respects, similar to the analogous structure of FIG. 13*a*. Electrical lines shown generally at 232 and hydraulic lines 234 and 236, the function of which will be described, are carried in the space provided in the roof corner.

FIG. 14, to which reference is now made, shows schematically the hydraulic ram lift system of this invention. In the preferred embodiment, four hydraulic rams 240, 242 and two rams not specifically shown are provided. One ram is provided in each of the four corners of the main cabin section of the cabin 30. A pump 244 is provided which may be manually operated or which may be electrically or motor driven, as desired. The pump is connected to the rams through a plurality of lines shown generally at 246, of which lines 234 and 236, shown in FIG. 13*b*, constitute a part. A detail of the hydraulic rams is shown in FIG. 16, to which reference is now made. The ram comprises a cylinder 248 having a piston 250 connected to a piston rod 252 which extends through a seal 254 at the bottom of the cylinder. Fluid is supplied through a cap 256 from line 246 at the top of the cylinder. Referring again to FIG. 14, the entire camper 30 may be lifted if piston rods 241 and 243 and the analogous piston rods of the other rams are permitted to extend downwardly from the camper cabin to engage a support beam such as the ground. Preferably a base such as tripods are provided to receive the ends of the piston rods. In this position, the upper section 32 of the camper 30 is locked to the lower section 34 by means which will be described hereinafter. Thus, as a force is exerted downwardly upon the support, such as the ground or other support means, the entire camper cabin is lifted. This lifting feature is highly useful in loading and unloading the camper from the pick-up and for storing the camper during periods of nonuse. All that is necessary is to drive the pick-up to the desired storage location, lift the camper from the pick-up, remove the pick-up and permit the camper body to be lowered onto any desired support means, such as a frame, the ground, or other facilities.

The upper section 32 is locked to the lower section 34 by a plurality of pin locks as shown best in FIGS. 15, 17 and 18, which will now be described. In a preferred embodiment, three pin locks 262, 264 and 266 are used on one side and three pin locks 268, 270 and 272 are used on the other side of the camper body. Ram piston rod release means 273, 274, 275 and 276 are also shown. This locking mechanism and the ram piston rod release mechanism which is interconnected therewith, as will be described, form an important part of this invention.

FIG. 17, to which reference is now made, shows a detail of one of the pin locks of this invention and its relation to the camper cabin of which the locking system is a highly desirable and important part. Attached to the floor 278 of the lower section of camper 30 by means of bracket 280 is a pivotally mounted shaft 282 to which an operating handle 284 and cam operators 286 are attached. Cam operator 286 is attached to link 288 by a pin 290. Link 288 is attached by pin 292 to locking pin 294 which is slidably received in a bracket 296 which also is mounted on the under side of floor 278 by frictional fasteners 298 or other convenient means. The operation of the lock is shown in FIGS. 17 and 18. Locking pin 294 is selectively received in aperture 300 which preferably has a metal receiving cup 302 therein. Thus, it will be seen that when handle 284 is in the position shown, the upper section of cabin 30 is locked in its fully telescoped position with respect to the lower section of cabin 30. When moved to the position shown in dotted lines in FIG. 17, the upper section is free to expand telescopically with respect to the lower section.

The means for selecting to lift the entire cabin or to expand the cabin telescopically as desired is interconnected with the locking means and is actuated by the same operating handle 284. This interconnection is shown best in FIG. 18. An arm 304 is moved by link 288 and is pivotally attached by pin 306 to link 308 which is pivotally and slidably attached to cam operator 310 by pin 312. Cam operator 310 operates plate 314 which may selectively cover aperture 316 which is below the end of a piston rod, for example 241. Thus it will be seen that when the locking mechanism is in the position shown in FIGS. 17 and 18, the upper section 32 is locked in its fully telescoped position with respect to the lower section 34 of camper cabin 30 and cover plate 314 is displaced to permit piston rods, such as 241 and 243, to extend downwardly from the upper section of the camper cabin to engage a support means, such as the ground or the like, to lift the entire camper. When the lock pins, for example pin 294, are disengaged from the upper section as by moving handle 284 to the second position shown in FIG. 17, cover plate 314 will cover aperture 316 preventing the hydraulic ram piston rods from extending below the camper thereby causing the camper to expand vertically. This vertical expansion, of course, includes expansion of both the main camper body and of the cab-over portion of the camper, as previously described.

Additional important features of this invention are shown in FIGS. 19 through 23 relating to the door structure. As shown best in FIGS. 19 and 20, the door structure of this invention comprises an inner door 320 and an outer door 322. Operators or knobs 324 and 326 are provided on the inner and outer doors respectively. The inner and outer doors are in telescopic relation with respect to each other, the outer door shown fully telescoped in FIGS. 19 and 20. When the camper is expanded, the outer door moves upwardly with respect to the inner door. It is highly desirable and an important part of this invention to provide means for opening the outer door both when the camper is expanded and when it is fully telescoped. Lock means and lock actuating means are shown in FIG. 19. The door is locked by door locking pin 328 which is received in a striker plate 330 in the door sill to permit locking of the door in any position. Lock pin 328 may be operated by conventional rack and pinion means. A novel rack and pinion actuating train is provided in this invention to permit the doors to be locked and unlocked from both the inside and the outside in both the expanded and telescoped positions. The lock actuating means includes a rack 332 having teeth 334 on a first side near the center of the rack and teeth 336 and 338 at both ends of the opposite side of the rack. The rack 332 is held in place by keepers 340 and 342. Knob 326 is attached by shaft 344 to a pinion gear 346. Pinion gear 346 is permanently engaged by teeth 334 on rack 332. In the position shown, teeth 338 are engaged by a pinion gear 348 which is also engaged with teeth 350 on rack 352. Rack 352 also has teeth 354 on its opposite end and is held in place by keepers 356 and 358. Teeth 354 on rack 352 are permanently engaged with pinion gear 360 which, as best shown in FIG. 20, is secured on the end of shaft 362 on which knob 324 rides. Of course, shafts 362 and 344 are rotatably received in doors 320 and 322. As shown in FIG. 19, teeth 354 are permanently engaged with pinion gear 360.

It will thus be seen that in the position shown, door lock pin 328 may be operated by rotating handle 326 which acts directly on door lock pin 328 and acts through the rack and pinion actuating arrangement on knob 324. From the inside, door lock pin 328 may be operated by turning knob 324 which acts through the rack and pinion actuating mechanism as previously described. Thus it is possible, as shown in the telescoped position, to open the door either from the inside or the outside. In the expanded position, teeth 336 on rack 332 are in engaging relationship with pinion 348. In this position, operation of handle 326 unlocks the door from the outside and the door may be unlocked by operation of knob 324 from the inside through the rack and pinion actuating mechanism.

It will thus be seen that a lock and a lock actuating mechanism has been provided which will permit the door to be opened in the expanded or collapsed position by operation of the same knobs or operating members.

Door 322 is suspended by a plurality of hinges 364, 366 and 368. These hinges move upwardly with the expansion of the camper in the manner previously described carrying the outer door 322 into its fully expanded position with relation to inner door 320.

Doors 320 and 322 are in telescoping relationship and slidably received with respect to each other at their edges, as best shown in FIGS. 21 and 22. Reference is made now in particular to FIG. 21. Attached to the opening edge of door 322 is a channel guide member 370 which extends from the outside of outer door 322 along the edges of doors 322 and 320 and engages the inside of inner door 320 in the manner shown. Channel guide 370 may be secured to outer door by frictional fastening means 372 or by other convenient means. A T-shaped slide member 374 is attached by screws 376 and 378 to the opening edge of inner door 320 and is received and slidably guided by channel guide 370 in the manner shown. The hinging and bottom structure of the doors is best shown in FIGS. 22 and 23 to which reference is now made. A rear channel guide member 390 is provided similar to the guide 370 on the opening edge of the door. Guide 390 may be secured to outer door 322 by a screw 392 and may, in addition, be secured to a weather strip member by a pin or rivet 396. A T-shaped guide member 398 is slidably received in channel guide 390 and is secured to the inner door 320 by screws 400 and 402 similar to the manner of securing T-shaped guide member 374 to the opening edge of the inner door. Also in a similar manner, an edge slide guide 404 is secured to the edge of door 322 by a frictional fastener or screw 406. The edge slide guide may be of aluminum or it may be of Teflon, nylon or other material to provide a sliding relationship with T-shaped guide member 398. An inner seal flange 408 and a weather strip slide 410 are provided to engage the inside of the inner door 320 to form a weather seal.

Weather sealing and slidable movement is provided by flange 412, which is secured by a plurality of rivets shown generally at 414 to the wall end cap 416, slidably engages the lip of flange 418, which is secured to end strip 420 of the inner wall by angle iron 422 using rivets shown generally at 324. End cap 416 is in the preferred embodiment a metal strip and is secured to outer wall 426 by screws 428. Similarly end strip or end cap 420 is secured to inner wall 430 by screws 432. The hinging arrangement is best shown in FIG. 23, to which reference is now made.

The bottom of the inner door is supported and hinged by hinge 434 which is secured to a T-support member 436 which is in turn secured to inner door 320 by screws 438 and 440. Outer door also rests upon T-support member 436 when the cabin is fully telescoped but is not attached thereto. The bottom of hinge 434 is attached to an angle iron 442 which forms a part of the floor of the camper cabin or may be attached in any other suitable manner to the floor or lower wall of the camper cabin. A door sill 444 is provided in the conventional manner.

A U-shaped guide member 446 is provide at the top of the door as shown in FIG. 23, and is secured to the top of the outer door by a screw 448 or by other frictional fastening means. The top of the door is also provided with a weather strip 450 and a flange 452 for providing a seal. End cap or strip 454 on the lower edge of wall 456 and a decorative molding 458 may also be provided.

It will be apparent that the camper cabin described hereinbefore and illustrated in the drawings accomplishes the objects of this invention.

There are several advantages to this which will be apparent upon examination of the structure and upon recognition of the problems facing the prior art. For example, the expandable cab-over camper provided in this invention may be fully telescoped and locked in position and carried along the highways at conventional traffic speeds with a minimum of wind resistance. The invention thus overcomes one of the most serious objections and problems heretofore resulting from portable camper cabins being carried on trucks or other vehicles.

Serious problems have also been encountered where camper cabins are carried along narrow bouncing roads through forests. It is often highly desirable to take the camper cabin into the more primitive areas of the forests along narrow winding roads with low overhanging branches. This has heretofore been impossible with conventional cab-over campers because of the height problem. With the camper cabin of this invention, it is possible to transport the camper cabin along roads with low overhanging branches and upon reaching the desired destination to expand the camper cabin to its full convenient volume with a single simple operation.

The camper cabin of this invention has structural advantages over those of the prior art with respect to sealing the weather out. For example, it is known in the prior art to provide cab-over sections for campers by pulling the cab-over section out of the camper proper onto the cab and supporting it by the cab. Aside from the obvious disadvantages of supporting the camper on the cab and the inconvenience and difficulty of manually pulling the section from the main camper over the cab, there are serious problems in sealing the joint between the camper and the main cabin. Obviously, it is easier and more effective to produce a seal with proper overlap around the lower edge of a structure than to provide a seal on the upper edge as is necessary in the prior art. The camper of this invention overcomes the serious objections to the expandable cab-over campers of the prior art.

It is apparent that there are many significant advantages to the structural features of this invention; however, such advantages will be apparent to those skilled in the art.

It will be understood, of course, that the invention as previously described with reference to specific structures and specific embodiments is not intended as limiting but as merely exemplary of the spirit of this invention. Many structural modifications and changes will be known and become apparent to those skilled in the art without departing from the spirit of the invention as defined in the appended claims.

We claim:

1. A portable expandable camper cabin comprising:
a lower section, said lower section including
a bottom portion conforming in size to the bed of a truck for reception and carriage by the truck, and
an integrally formed cab-over portion for projection over the cab of the truck;
an upper section telescopically received over the lower section, said upper section including
an integrally formed cab-over portion telescopically received over the lower cab-over portion,
means for moving the upper section including the upper cab-over portion vertically with respect to the lower section including the lower cab-over portion and
said moving means including a selectively extensible member for extension downwardly from the lower section of the cabin for engagement with supporting means to lift the entire camper cabin upwardly.

2. The camper cabin of claim 1 further including
engaging means for selectively engaging the bottom end of the extensible member to limit its motion with respect to the lower section of the cabin,
lock means for selectively locking the upper section in its fully telescoped position relative to the lower section, and
lock actuating means for simultaneously locking the upper section in its fully telescoped position and freeing the extensible member for extension and, in a second position, limiting the motion of the extensible member and freeing the upper section for vertical movement relative to the lower section.

3. The camper cabin of claim 1 wherein the moving means includes a plurality of lifting rams, a first end of the rams engaging the upper portion of the camper cabin, means for selectively limiting movement of the second end of the rams with respect to the lower section of the camper cabin and selectively for permitting the second end of the rams to extend downwardly from the lower section of the camper cabin for engagement with a support for lifting the entire camper, and means for actuating said rams.

4. The camper cabin of claim 3 further including
lock means for selectively locking the upper section in its fully telescoped position relative to the lower section, and
lock actuating means, in a first position, for locking the upper section in its fully telescoped position and positioning the movement limiting means to permit the second end of the hydraulic rams to extend downwardly from the lower section and, in a second position, to free the upper section for relative movement and to limit the movement of the second end of the rams with respect to the lower section.

5. The camper cabin of claim 3 further including a door for the camper cabin, said door comprising a lower door section, an upper door section telescopically received over the lower door section for selective vertical movement with respect to the lower door section from a fully telescoped position to a fully expanded position, a door lock mechanism for selectively locking the door, and a door lock actuator for operating the door lock mechanism by the same manipulation when the door is expanded and when it is telescoped.

6. The camper cabin of claim 5 wherein the lock actuator includes
a shaft extending through the upper door section,
an operator on the outer end of the shaft,
a pinion gear on the inner end of the shaft,
a rack mechanism including teeth engaging the pinion gear, and a plurality of sets of teeth one of which set of teeth engages the door lock mechanism in the telescoped position and another set of teeth engages the door lock mechanism in the expanded position.

7. The camper cabin of claim 1 further including a door for the camper cabin, said door comprising a lower door section, an upper door section telescopically received over the lower door section for selective vertical movement with respect to the lower door section from a fully telescoped position to a fully expanded position, a door lock mechanism for selectively locking the door, and a door lock actuator for operating the door lock mechanism by the same manipulation when the door is expanded and when it is telescoped.

8. The camper cabin of claim 7 wherein the lock actuator includes:
a shaft extending through the upper door section,
an operator on the outer end of the shaft,
a pinion gear on the inner end of the shaft,
a rack mechanism including teeth engaging the pinion gear, and a plurality of sets of teeth one of which set of teeth engages the door lock mechanism in the telescoped position and another set of teeth engages the door lock mechanism in the expanded position.

9. The camper cabin of claim 1 further including a door for the camper cabin, said door comprising a lower door section, an upper door section telescopically received over the lower door section for selective vertical movement with respect to the lower door section from a fully telescoped position to a fully expanded position, a door lock mechanism for selectively locking the door, and a door lock actuator for operating the door lock mechanism by the same manipulation when the door is expanded and when it is telescoped.

10. The camper cabin of claim 1 further including a floating cab-over section telescopically received between the lower cab-over portion and the upper cab-over portion.

11. The camper cabin of claim 10 wherein the moving means includes a selectively extensible member for extension downwardly from the lower section of the cabin for engagement with supporting means to lift the entire camper cabin upwardly.

12. The camper cabin of claim 11 including a door for the camper cabin, said door comprising a lower door section, an upper door section telescopically received over the lower door section for selective vertical movement with respect to the lower door section from a fully telescoped position to a fully expanded position, a door lock mechanism for selectively locking the door, and a door lock actuator for operating the door lock mechanism by the same manipulation when the door is expanded and when it is telescoped.

13. A portable expandable camper cabin comprising:
a lower section,
an upper section in telescoping relation with the lower section,
lifting means on said camper cabin for selectively expanding the camper cabin by moving the upper section vertically with respect to the lower section and for selectively lifting the entire camper cabin,
said lifting means including at least one relatively movable member selectively engageable with said lower section or with a support, for expanding the camper cabin by moving the upper section vertically with respect to the lower section when said movable member engages said lower section and for lifting the entire camper cabin when said movable member engages said support.

14. The camper cabin of claim 13 wherein the lifting means includes a first element, means attaching said first element to the upper section, a second element operably connected to the first element and in telescoping relation therewith for selective extensible movement with respect to the first element, means for selectively limiting motion of the second element with respect to the lower section for expanding the camper cabin vertically and selectively permitting the second element to extend downwardly from the lower section for engagement with a support for lifting the entire camper cabin and means for actuating said first and second elements.

15. The camper cabin of claim 13 wherein the lower section includes an integral cab-over portion and the upper section includes an integral cab-over portion in telescoping relation with the lower cab-over portion.

16. The camper cabin of claim 15 further including a floating cab-over portion in telescoping relation with the upper and lower cab-over portion to permit additional relative expansion of the cab-over portion of the camper cabin.

17. A portable expandable camper cabin comprising:
a lower section, said lower section including
a bottom portion conforming in size to the bed of a truck for reception and carriage by the truck, and
an integrally formed cab-over portion for projection over the cab of the truck;

an upper section telescopically received over the lower section, said upper section including
an integrally formed cab-over portion telescopically received over the lower cab-over portion,
a floating window section telescopically received between the lower cab-over portion and the upper cab-over portion, said window section being fully covered by the upper cab-over portion when the upper and lower sections are fully telescoped and fully exposed to permit entry of light and air when the upper and lower sections are fully expanded,
means for moving the upper section including the upper cab-over portion vertically with respect to the lower section including the lower cab-over portion,
said moving means including a plurality of lifting rams,
a first end of the rams engaging the upper portion of the camper cabin,
means for selectively limiting movement of the second end of the rams with respect to the lower section of a camper cabin and selectively for permitting the second end of the rams to extend downwardly from the lower section of the camper cabin for engagement with a support for lifting the entire camper,
and means for actuating said rams.

18. The camper cabin of claim 17 further including
lock means for selectively locking the upper section in its fully telescoped position relative to the lower section, and
lock actuating means, in a first position, for locking the upper section in its fully telescoped position and positioning the movement limiting means to permit the second end of the hydraulic rams to extend downwardly from the lower section and, in a second position, to free the upper section for relative movement and to limit the movement of the second end of the rams with respect to the lower section.

19. The camper cabin of claim 17 further including a door for the camper cabin, said door comprising a lower door section, an upper door section telescopically received over the lower door section for selective vertical movement with respect to the lower door section from a fully telescoped position to a fully expanded position, a door lock mechanism for selectively locking the door, and a door lock actuator for operating the door lock mechanism by the same manipulation when the door is expanded and when it is telescoped.

References Cited

UNITED STATES PATENTS

| | | | |
|---|---|---|---|
| 1,852,984 | 4/1932 | Smith. | |
| 2,739,833 | 3/1956 | Schenkel et al. | |
| 2,862,759 | 12/1958 | Huth. | |
| 2,879,103 | 3/1959 | Hall. | |
| 3,021,170 | 2/1962 | Cornelius. | |
| 3,143,121 | 8/1964 | McKee. | |
| 3,145,046 | 8/1964 | Orn et al. | |
| 3,321,233 | 5/1967 | Davis. | |
| 3,356,407 | 12/1967 | McGarry | 296—23 |

BENJAMIN HERSH, Primary Examiner

J. A. PEKAR, Assistant Examiner

U.S. Cl. X.R.

214—515; 254—45